(12) United States Patent
Keefer et al.

(10) Patent No.: US 7,850,461 B2
(45) Date of Patent: Dec. 14, 2010

(54) CLIP FOR MAINTAINING CONNECTION WITH ELECTRICAL TAIL

(75) Inventors: Kenneth J. Keefer, Westford, MA (US); Anthony F. Chernefsky, Dracut, MA (US); Bülent Bulat, Framingham, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 307 days.

(21) Appl. No.: 12/027,630

(22) Filed: Feb. 7, 2008

(65) Prior Publication Data

US 2008/0189919 A1 Aug. 14, 2008

Related U.S. Application Data

(60) Provisional application No. 60/889,020, filed on Feb. 9, 2007.

(51) Int. Cl.
*H01R 12/00* (2006.01)
(52) U.S. Cl. ....................................................... 439/67
(58) Field of Classification Search ................... 439/67; 349/150
See application file for complete search history.

(56) References Cited

U.S. PATENT DOCUMENTS

| 4,019,798 | A | * | 4/1977 | Zielinski | 439/67 |
| 4,531,793 | A | * | 7/1985 | Hochgesang | 439/55 |
| 5,462,441 | A | * | 10/1995 | Renn et al. | 439/67 |
| 6,123,551 | A | * | 9/2000 | Westfall | 439/67 |
| 6,454,573 | B2 | | 9/2002 | Hayashi et al. | |

FOREIGN PATENT DOCUMENTS

| JP | 06-283236 A | 10/1994 |
| JP | 2001-143784 A | 5/2001 |
| JP | 2001-143793 A | 5/2001 |
| JP | 2001-283955 A | 10/2001 |
| JP | 2001-313105 A | 11/2001 |
| JP | 2001-313106 A | 11/2001 |

* cited by examiner

*Primary Examiner*—Xuong M Chung Trans
(74) *Attorney, Agent, or Firm*—Johannes P. M. Kusters

(57) ABSTRACT

Disclosed is a mechanical device that can be used to help maintain a connection between an electrical tail and an electronic device such as a touch sensor screen. The mechanical device deflects upon installation over the tail and the electronic device so that pressure caused by spring action helps maintain the connection. The mechanical device also includes a cutout region designed so that the tail can freely pass through the mechanical device.

14 Claims, 5 Drawing Sheets

CLIP FOR MAINTAINING CONNECTION WITH ELECTRICAL TAIL

This application claims priority to U.S. Provisional Application No. 60/889,020, filed Feb. 9, 2007, which is incorporated herein by reference.

The present invention relates generally to mechanical clips for maintaining electrical connections, particularly electrical connections between a touch sensor device and a flat electrical tail.

BACKGROUND

Touch screens function by generating signals based on a touch input, and communicating those signals to control electronics so that information about the touch input can be determined. The communications link between the touch screen sensor and the electronics is typically a flexible tail that is bonded on one end to the sensor and mechanically connected on the other end to a controller board. The bond between the tail and the sensor can be strained during shipping and handling of the sensor, during installation of the sensor, and over time due to normal use, wear and tear, and maintenance activities.

SUMMARY OF THE INVENTION

The present disclosure provides a mechanical clip for securing an electrical tail to an electronic device, and assemblies that include an electronic device, an electrical tail attached to the device, and a mechanical clip installed over the tail and the device.

In some embodiments, the present disclosure provides an assembly that includes a flexible electrical tail having one or more tail contact pads in electrical contact with signal leads on a touch screen sensor. The assembly further includes a mechanical clip installed over the electrical tail and the touch screen sensor for applying pressure to help maintain the electrical contact between the tail contact pads and the sensor signal leads. The mechanical clip has one or more pressure tabs engaging the electrical tail, one or more retention tabs opposing the one or more pressure tabs and engaging a side of the sensor opposite the tail connection, a vertical support section separating the one or more pressure tabs from the one or more retention tabs at a distance sufficient to cause at least some deflection of the clip when installed over the tail and the sensor, and an opening that allows the tail to pass through the clip without being engaged by the one or more retention tabs.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

The present disclosure may be more completely understood and appreciated in consideration of the following detailed description of various embodiments in connection with the accompanying drawings, in which.

Figure 1:
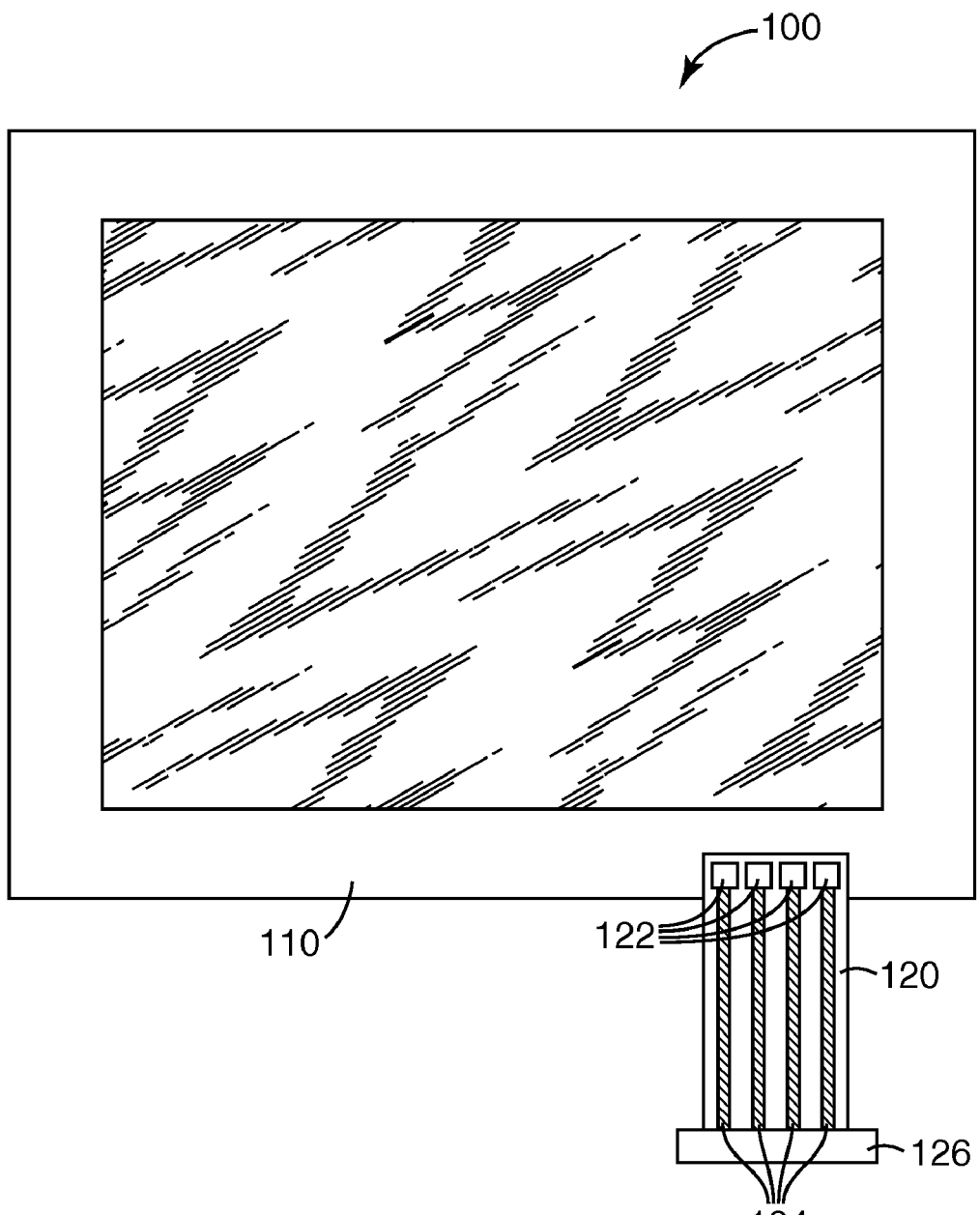
FIG. 1 is a schematic top view of an electronic device such as a touch sensor screen that includes an attached electrical tail.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present disclosure is generally directed to mechanical devices, and assemblies having mechanical devices, for maintaining and/or increasing the robustness of an electrical connection interface between an electrical tail and an electronic device such as a touch screen sensor. The mechanical devices of the present disclosure, referred to as clips, help maintain the electrical connection between the tail and the touch screen through a spring force caused by a deflection of the clip upon installation. In general, the clips include tabs for engaging the tail and upper side of the sensor (along with any other components such as optional tail strain relief structures) and tabs for engaging the bottom side of the sensor, where the distance between these sets of tabs is selected to achieve a desired amount of clip deflection, and therefore a desired amount of connection-maintaining pressure, upon installation of the clip.

FIG. 1 shows a touch sensor 100 that includes a touch sensitive screen 110 and an electrical tail 120 connected to the touch sensitive screen 110. The electrical tail 120 can be used to communicate signals between the touch sensitive screen 110 and controller electronics (not shown) so that information related to touch inputs on the screen 110 can be determined. The touch sensitive screen includes multiple signal lines (not shown), for example one signal line running to each corner of the screen. The signal lines are connected to contact pads (not shown) located near one edge of the screen. The electrical tail 120 includes contact pads 122 arranged to coincide with the contact pads on the screen when the tail is properly positioned. Conductors 124 such as wires connect the contact pads 122 of the tail 120 to a connector 126 that can be coupled to controller electronics or to a device that houses controller electronics.

The tail 120 is flexible, and in many embodiments is formed from a flat ribbon cable or other flat flexible configuration such as copper wires printed on a polyimide film. The tail 120 can be bonded or adhered to screen 110 through any suitable means including conductive epoxies or adhesives (including z-axis conductive adhesives), soldering, welding, or the like. Even without using a bonding method or medium, tail clips of the present disclosure can be used to maintain the connection of the tail 120 to the screen 110. Preferably, the tail 120 is positioned and adhered to the screen 110, and then a tail clip of the present disclosure is installed to help maintain the connection and/or to help relieve stresses to the tail that could otherwise damage the tail or its connection to the touch screen.

The touch sensor screen 110 can be any touch sensitive device that includes leads for communicating signals to and from controller electronics through the electronic tail. Typically, the touch screen 110 is meant to be mounted over a display so that the display is viewable through the screen 110. In such configurations, the tail 120 is generally connected along an edge of the screen in a border region that extends beyond the display viewing area, and that is typically covered by a frame or bezel.

Figure 2A:
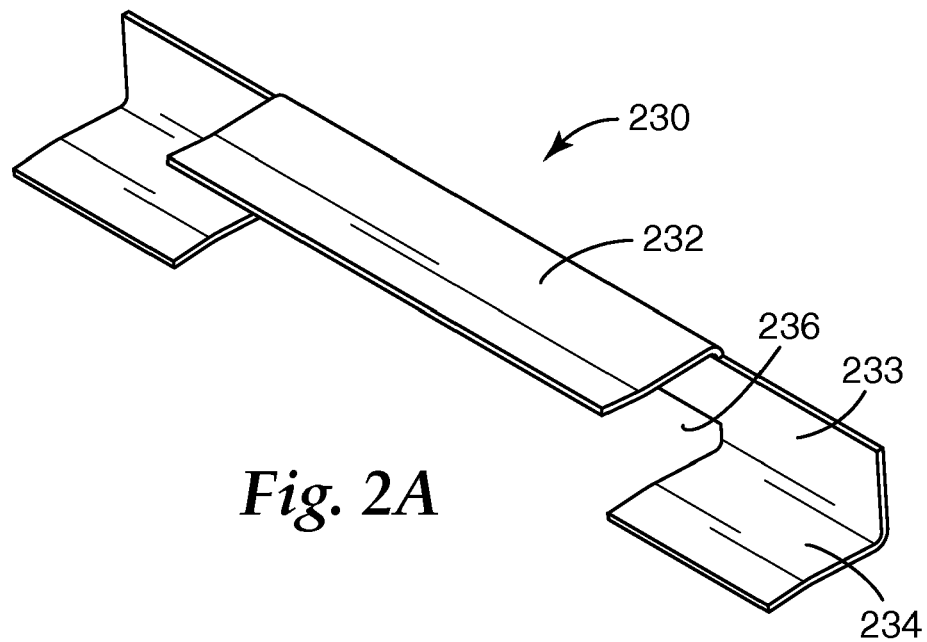
FIGS. 2A and 2B are different perspective views of electronic tail clips in accordance with the present disclosure.
Figure 2B:
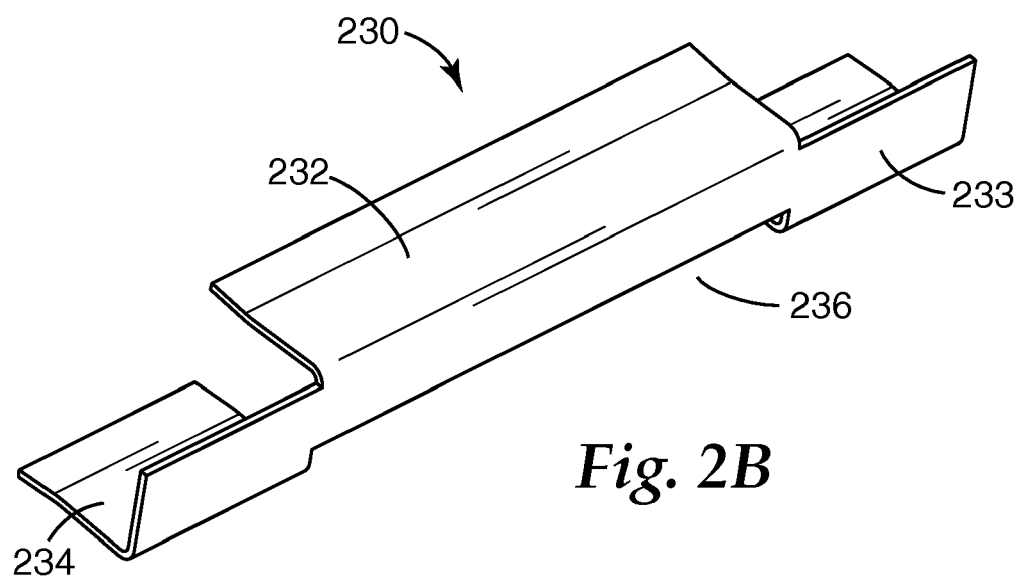

FIGS. 2A and 2B show perspective views of a tail clip 230 according to the present disclosure. Tail clip 230 includes a pressure tab 232 for contacting and biasing the tail against the contact pads of the touch screen, retention tabs 234 for engaging the opposite side of the touch screen so that the clip remains in place, a vertical web portion 233 supporting and vertically separating the pressure tab from the retention tabs, and a tail cutout 236 that is sized and positioned to allow passage of the tail when the clip is properly aligned. The width of the cutout region 236 can also be sized to help ensure proper alignment of the retention tab. That is, when the tail is properly inserted, the pressure tab should reside directly over the tail/screen interface. Either or both of the pressure tab and retention tab(s) can be provided with a curvature that facilitates attaching the clip to the screen and tail, as can be seen in FIGS. 2A and 2B.

Various properties of the clip can be selected to provide the desired contact maintenance force. The clip essentially acts as a spring system, applying pressure (force) to the screen/tail connection by the deflection of the pressure tab(s) through a given distance. The greater the deflection of the pressure tab(s), the greater the force applied. If the force/deflection relationship is known, the design of the clip can be adjusted to supply a desired amount of force. During installation on a sensor assembly, each of the components of the clip (i.e., the pressure tab(s), the retention tab(s), and the vertical support) experience a small amount of deflection, thus providing a corresponding spring force, the sum of which is directed to the sensor/tail connection. In addition to amount of deflection upon installation, there are other factors that relate to the amount of force that the clip will generate. One additional factor is the geometrical shape of the clip, particularly the vertical support portion. By changing the shape of the vertical support, its stiffness can be altered, thereby providing either more or less spring force. Other additional factors include the type and thickness of the clip material. For example, increasing the thickness of the clip in the vertical support region increases the spring constant, and therefore increases the force.

Figure 3:
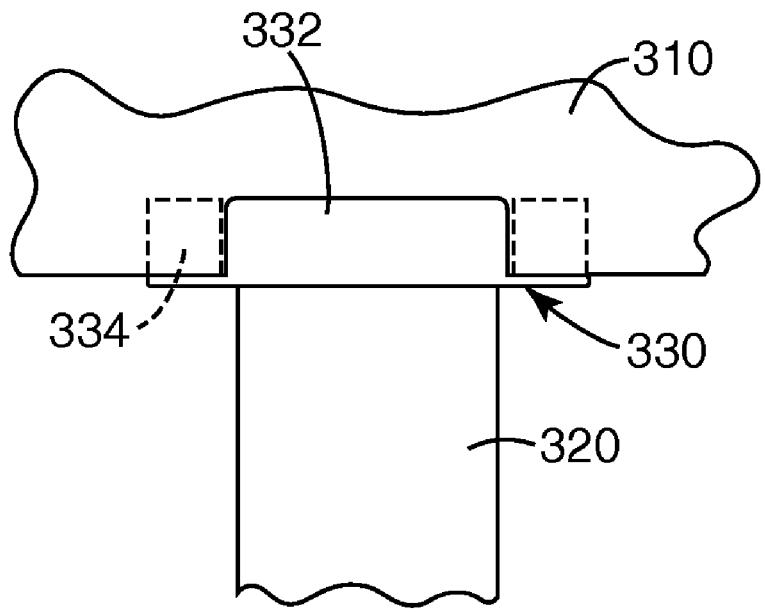
FIG. 3 is a schematic top view of a clip installed over an electronic tail attached to a device in accordance with the present disclosure.

FIG. 3 is a partial top view of a clip 330 of the present disclosure installed over an electrical tail 320 attached to a touch sensor screen 310. The pressure tab 332 of the clip 330 covers the area where the tail 320 is attached to the sensor 310. The retention tabs 334 contact the under side of the sensor 310, and thus are shown in dashed lines. The vertical separation between the retention tabs and the pressure tab is selected so that when the clip is installed as shown in FIG. 3, there is at least a small amount of deflection in the clip that caused the pressure tab to exert a force in the interfacial area between the tail and the sensor, thus making the connection more robust.

Figure 4:
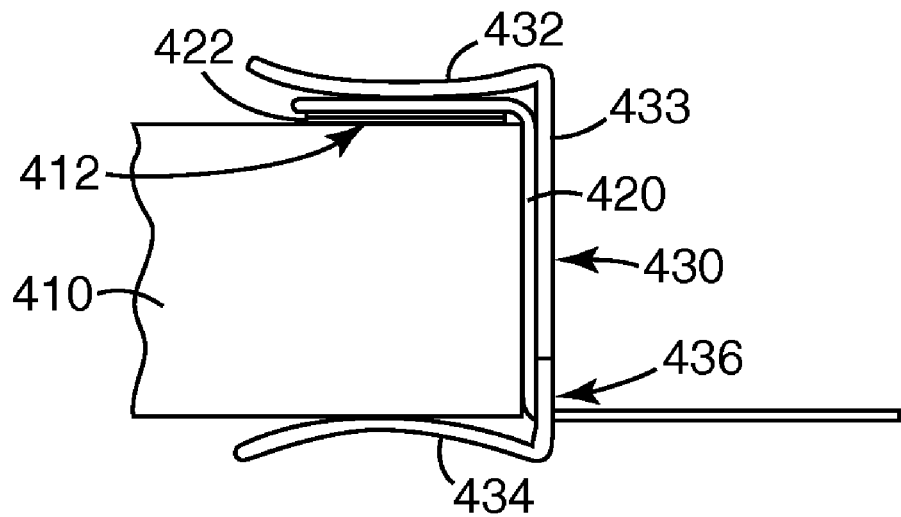
FIG. 4 is a schematic side view of a clip installed over an electronic tail attached to a device in accordance with the present disclosure.

FIG. 4 is a partial side view of a clip 430 of the present disclosure installed over an electrical tail 420 attached to a touch sensor screen 410. The tail 420 includes a contact pad 422 that is in electrical contact with a corresponding contact pad 412 disposed on the sensor 410. In the side view profile, it can be seen that the retention tab 434 and the pressure tab 432 have been provided with some curvature, which is an optional design choice that can make installation easier. When installed, the vertical support portion 433 will experience some deflection, even though deflection of the vertical support is not indicated in the drawing. The tail 420 passes through the tail cutout 436, which is positioned near the bottom of the clip 430. As can be seen, clip designs having the tail cutout near the bottom of the clip may require that the tail make at least one and often two 90° turns. While this can stress the electrical leads in the tail, many flexible tails can more than withstand this type of bending, and the clip itself helps to stabilize the tail in this configuration so that any external forces acting on the tail will be unlikely to stress the tail/sensor connection.

Figure 5:
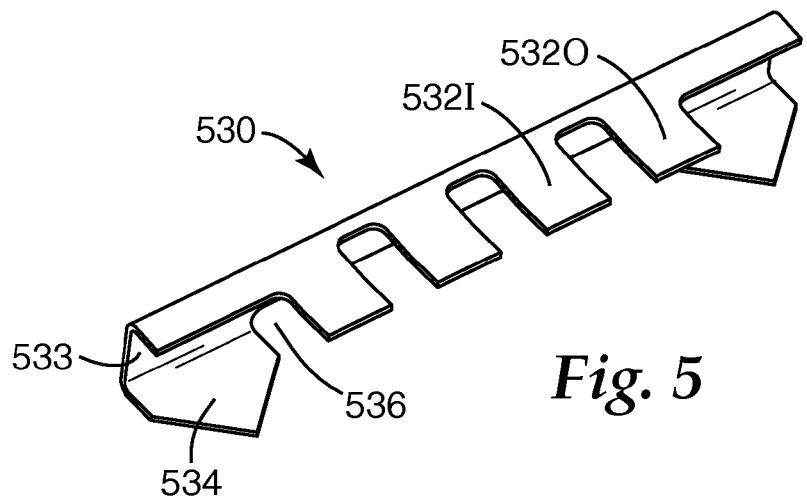
FIG. 5 is a perspective view of an alternative tail clip in accordance with the present disclosure.

FIG. 5 shows another clip 530 according to the present disclosure. Clip 530 includes a segmented pressure tab portion that includes four tabs, two inner pressure tabs 532I and two outer pressure tabs 532O. The number, size and placement of pressure tab segments can be selected to correspond to the number, size and placement of contact pad connections that are made between the tail and the sensor. Such a segmented clip design can help accommodate non-uniformities in the tail connection by allowing each pressure tab segment to individually reinforce the individual contact pad connections. Clip 530 also includes pointed retention clips 534 that can be designed to pierce a mounting gasket, often used to adhere the periphery of the back of the sensor to a frame of an electronic display assembly. This can be useful in circumstances where it is desired or anticipated that the clip will be installed after the touch sensor screen is mounted, for example when reinforcing sensor tail connections in the field.

While it may be desirable to impart a certain amount of curvature to the pressure tabs of clip 530, there may be circumstances under which it is desirable for the pointed retention tables 534 to remain flat without any imparted curvature. For example, when clip 530 is to be installed on a mounted touch sensor screen, curved retention clips may work to inhibit proper piercing of the gasket material, resulting in a less than optimal installation.

Figure 6:
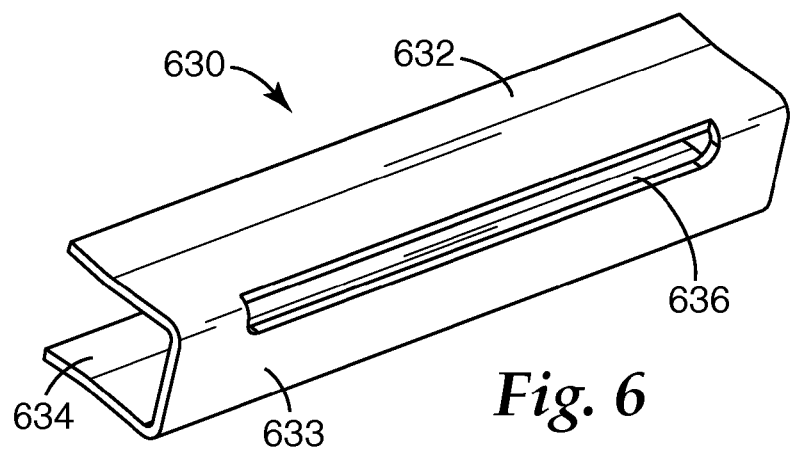
FIG. 6 is a perspective view of an alternative tail clip in accordance with the present disclosure.

FIG. 6 shows a clip 630 according to the present disclosure where the tail cutout 636 is a slot in the vertical support 633 near the top of the clip and just below the pressure tab 632, rather than being located near the bottom of the clip as in FIGS. 2A, 2B, 3, 4 and 5. In FIG. 6, the retention tab 634 can extend across the entire bottom of the clip 630, which can help provide more uniform pressure across the retention tab 632. Locating the tail cutout near the top of the clip can avoid the need to subject the tail to right angle turns. When a clip such as clip 630 is used, the tail may need to be threaded through the slot 636 prior to bonding the tail to the sensor, and so it may not be practical to use such a clip design when it is intended for field maintenance work.

Figure 7:
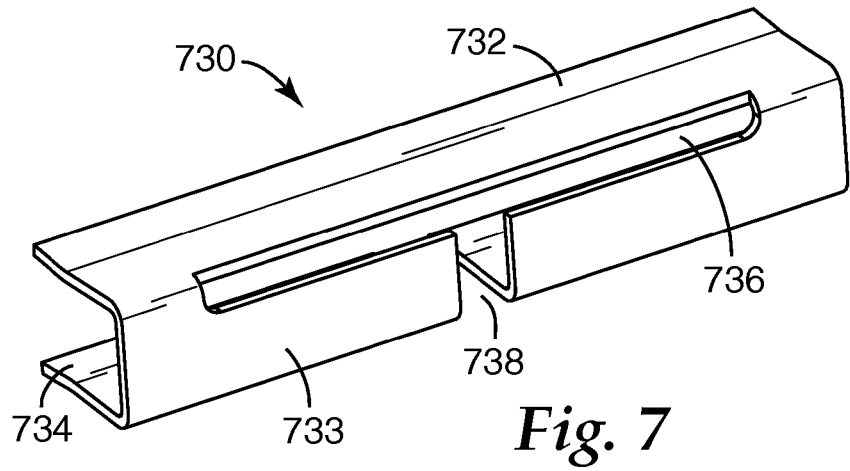
FIG. 7 is a perspective view of an alternative tail clip in accordance with the present disclosure.

FIG. 7 shows a clip 730 similar to the clip shown in FIG. 6 except that clip 730 includes a gap 738 oriented vertically in the vertical support 733. The gap 738 may allow a pre-installed tail to be threaded into the tail cutout slot 736. Clip 730 includes a pressure tab 732 and a retention tab 734 that is similar to the clip shown in FIG. 6 except that the retention tab 734 is separated by the access gap 738.

Figure 8A:
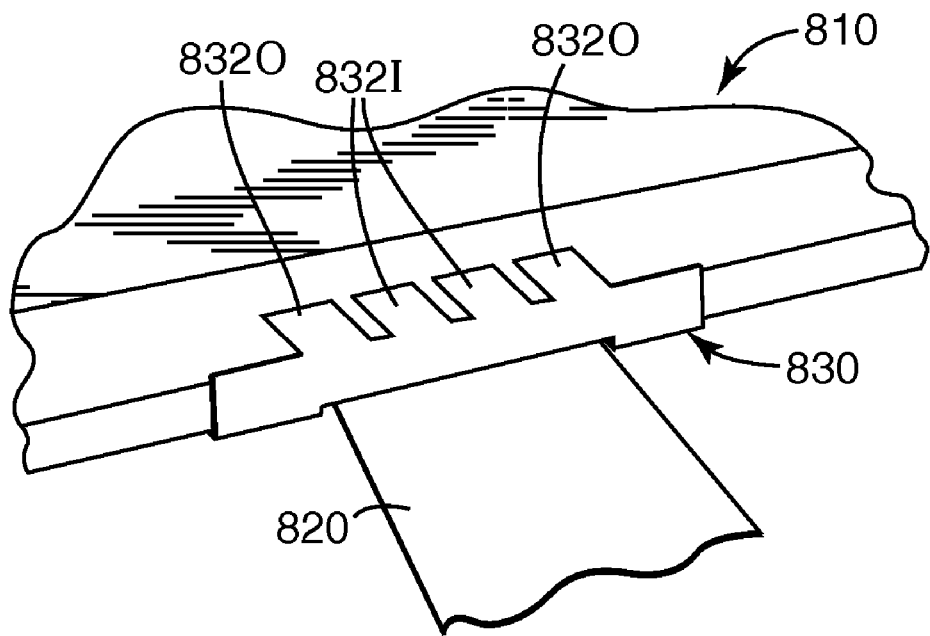
FIGS. 8A and 8B are schematic top and bottom views, respectively, of a clip installed over an electronic tail attached to a device in accordance with the present disclosure.
Figure 8B:
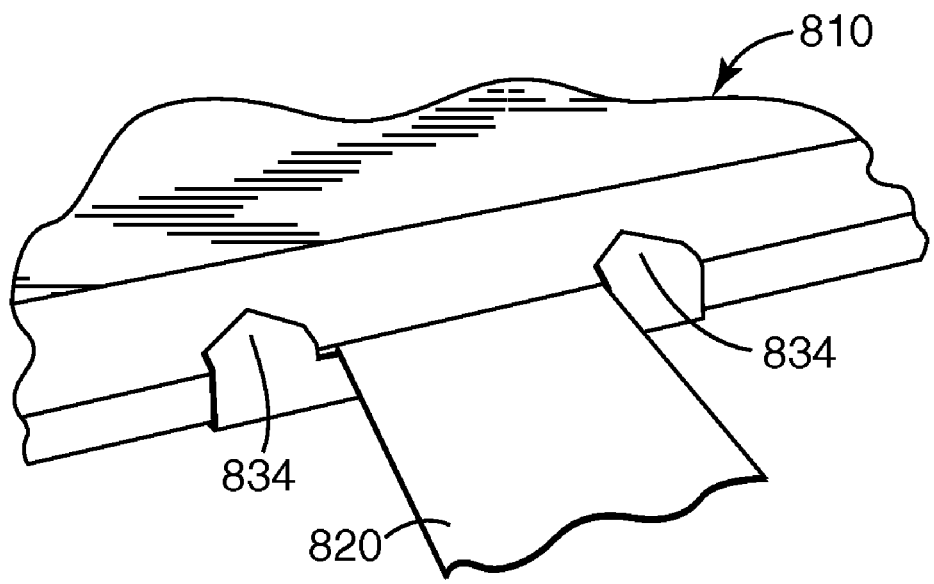

FIGS. 8A and 8B show a clip 830 installed over an electrical tail 820 bonded to a touch sensor screen 810. The tail 820 has four contact pads (not visible in the drawing) that are electrically connected to four contact pads on the sensor (sensor contacts also not visible). The clip 830 has four segmented pressure tabs, including two outer pressure tabs 832O and two inner pressure tabs 832I. The segmented pressure tabs are each sized and located to apply pressure directly to one of the individual tail/sensor electrical connections. Clip 830 also has two pointed retention tabs 834 on the reverse side of the clip, as can be seen in FIG. 8B. The retention tables 834 are flat and flush with the bottom side of the sensor screen 810. The tail 820 is restrained at the edge of the sensor screen 810 behind the vertical support of the clip 830, ultimately emerging from the clip at the tail cutout, which located at the bottom portion of the clip.

As one example, a clip similar to that shown in FIG. 5 can be made by cutting and bending 0.013 inch thick nickel alloy (for example, Inconel alloy X-750), and heat treating in accordance with the AMS 5598 annealing procedure to a final Rockwell hardness of C34 to C38. For a sensor/tail stack-up thickness that averages about 0.145 inches with a minimum thickness of about 0.140 inches, such a clip can be made where the closest distance between the pressure tabs and the retention tabs is about 0.135 inches. This provides sufficient deflection even at the minimum sensor/tail stack-up thickness so that the spring action of the clip produces a desired pressure.

The foregoing description of the various embodiments has been presented for the purposes of illustration and description. It is not intended to be exhaustive or to limit the invention to the precise form disclosed. Many modifications and variations are possible in light of the above teaching. For example, the detection methodologies described herein may be used in connection with a wide variety of touch implements, including tethered implements and implements that house a battery or other power source. It is intended that the scope of the invention be limited not by this detailed description, but rather by the claims appended hereto.

We claim:

1. An assembly comprising:
   a flexible electrical tail including one or more tail contact pads in electrical contact with signal leads on a touch screen sensor; and
   a mechanical clip installed over the electrical tail and the touch screen sensor for applying pressure to help maintain the electrical contact between the tail contact pads and the sensor signal leads, the mechanical clip comprising one or more pressure tabs engaging the electrical tail, one or more retention tabs opposing the one or more pressure tabs and engaging a side of the sensor opposite the tail connection, a vertical support section separating the one or more pressure tabs from the one or more retention tabs at a distance sufficient to cause at least some deflection of the clip when installed over the tail and the sensor, and an opening that allows the tail to pass through the clip without being engaged by the one or more retention tabs, wherein the opening is at least partially disposed in the vertical support section.

2. The assembly of claim 1, wherein the tail is bonded to the touch screen sensor in the electrical contact area using a conductive adhesive.

3. The assembly of claim 1, wherein the one or more retention tabs comprise two retention tabs, each disposed on opposing ends of the opening.

4. The assembly of claim 1, wherein the one ore more pressure tabs are curved in a manner that facilitates installation of the clip.

5. The assembly of claim 1, wherein the one or more retention tabs are curved in a manner that facilitates installation of the clip.

6. The assembly of claim 1, wherein the one or more pressure tabs are provided as a plurality of segmented pressure tabs sized and located to coincide with the signal leads on the sensor.

7. The assembly of claim 1, wherein the one or more retention tabs are pointed in a manner that facilitates installation of the clip.

8. The assembly of claim 1, wherein the clip restrains the tail at an additional location other than the electrical contact area.

9. The assembly of claim 1, wherein the opening is located near the one or more retention tabs.

10. The assembly of claim 1, wherein the opening is located near the one or more pressure tabs, and is accessible via a slot in the vertical support section.

11. The assembly of claim 1, wherein the touch screen sensor is secured to a frame by use of a gasket, and wherein the one or more retention tabs are configured to pierce the gasket to directly engage the touch screen sensor.

12. The assembly of claim 1, wherein the opening includes a slot.

13. A method for use with a touch screen sensor assembly having a flexible electrical tail including one or more tail contact pads in electrical contact with signal leads on a touch screen sensor, the method comprising:
   providing a mechanical clip comprising one or more pressure tabs adapted to engage the electrical tail, one or more retention tabs opposing the one or more pressure tabs and adapted to engage a side of the sensor opposite the tail connection, a vertical support section separating the one or more pressure tabs from the one or more retention tabs at a distance sufficient to cause at least some deflection of the clip when installed over the tail and the sensor, and an opening configured to allow the tail to pass through the clip without being engaged by the one or more retention tabs, wherein the opening is at least partially disposed in the vertical support section; and
   installing the mechanical clip over the electrical tail and the touch screen sensor.

14. The method of claim 13, wherein the touch screen sensor assembly is secured to a frame by use of a gasket, and wherein the step of installing the mechanical clip comprises piercing the gasket with the one or more retention tabs to directly engage the touch screen sensor.

* * * * *